United States Patent
Han et al.

(10) Patent No.: US 10,233,088 B2
(45) Date of Patent: Mar. 19, 2019

(54) COATING AGENT FOR ELECTRICAL STEEL SHEET, MANUFACTURING METHOD THEREFOR AND ELECTRICAL STEEL SHEET COATING METHOD USING SAME

(71) Applicant: POSCO, Pohang-Si, Gyeongsangbuk-Do (KR)

(72) Inventors: Min Soo Han, Pohang-si (KR); Chang Soo Park, Pohang-si (KR); Dae-Uk Kim, Pohang-si (KR); Ho-Kyung Shim, Pohang-si (KR); Soon-Bok Park, Pohang-si (KR)

(73) Assignee: POSCO, Pohang-si, Gyeongsangbuk-ro (KR)

( * ) Notice: Subject to any disclaimer, the term of this patent is extended or adjusted under 35 U.S.C. 154(b) by 321 days.

(21) Appl. No.: 15/107,905

(22) PCT Filed: Dec. 17, 2014

(86) PCT No.: PCT/KR2014/012491
§ 371 (c)(1),
(2) Date: Jun. 23, 2016

(87) PCT Pub. No.: WO2015/099355
PCT Pub. Date: Jul. 2, 2015

(65) Prior Publication Data
US 2016/0322138 A1   Nov. 3, 2016

(30) Foreign Application Priority Data

Dec. 23, 2013   (KR) .................. 10-2013-0161895
Dec. 16, 2014   (KR) .................. 10-2014-0181751

(51) Int. Cl.
*C23C 22/22*   (2006.01)
*C01B 35/14*   (2006.01)
(Continued)

(52) U.S. Cl.
CPC .............. *C01B 35/143* (2013.01); *C09D 1/00* (2013.01); *C21D 1/30* (2013.01); *C21D 9/46* (2013.01);
(Continued)

(58) Field of Classification Search
CPC .. C21D 1/30; C21D 9/46; C23C 22/22; C23C 22/74
See application file for complete search history.

(56) References Cited

U.S. PATENT DOCUMENTS 4,347,085 A * 8/1982 Haselkorn ................ C21D 1/70
148/245

FOREIGN PATENT DOCUMENTS

JP   S60-152681 A   8/1985
JP   H04-99878 A   3/1992
(Continued)

OTHER PUBLICATIONS

International Search Report and Written Opinion issued in corresponding International Patent Application No. PCT/KR2014/012491, dated Apr. 9, 2015; with partial English translation.

*Primary Examiner* — Lois L Zheng
(74) *Attorney, Agent, or Firm* — Morgan Lewis & Bockius LLP

(57) ABSTRACT

A coating agent for an electrical steel sheet and a manufacturing method therefor are disclosed. A coating agent for an electrical steel sheet according to an example embodiment of the present invention includes a metal phosphate derivative solution, colloid silica, chromium oxide, and solid silica, and a solvent, wherein the metal phosphate derivative is a single material of a magnesium phosphate derivative or a mixed material of an aluminum phosphate derivative and a magnesium phosphate derivative, and in the mixed mate- (Continued)

(a)

(b)

rial, an amount of aluminum phosphate derivative is 10 wt % or less (not including 0%).

9 Claims, 3 Drawing Sheets

(51) Int. Cl.
    *C21D 9/46*     (2006.01)
    *C21D 1/30*     (2006.01)
    *C23C 22/20*     (2006.01)
    *C09D 1/00*     (2006.01)
    *H01B 3/10*     (2006.01)
    *C23C 22/74*     (2006.01)
    *H01F 1/18*     (2006.01)

(52) U.S. Cl.
    CPC .............. *C23C 22/20* (2013.01); *C23C 22/22* (2013.01); *C23C 22/74* (2013.01); *H01B 3/10* (2013.01); *H01F 1/18* (2013.01)

(56) References Cited

FOREIGN PATENT DOCUMENTS

| | | |
|---|---|---|
| JP | H06-065755 A | 3/1994 |
| JP | H06-158340 A | 6/1994 |
| JP | H08-239769 A | 9/1996 |
| JP | H08-239770 A | 9/1996 |
| JP | H08-333640 A | 12/1996 |
| JP | 3604306 B2 | 12/2004 |
| JP | 2012-122118 A | 6/2012 |
| JP | 2013-112837 A | 6/2013 |
| JP | 2013-245395 A | 12/2013 |
| KR | 10-0711774 B1 | 4/2007 |
| KR | 10-0733344 B1 | 6/2007 |
| KR | 10-1141280 B1 | 5/2012 |
| KR | 10-1308732 B1 | 9/2013 |

* cited by examiner (a)

(b)

COATING AGENT FOR ELECTRICAL STEEL SHEET, MANUFACTURING METHOD THEREFOR AND ELECTRICAL STEEL SHEET COATING METHOD USING SAME

RELATED APPLICATIONS

This application is the U.S. National Phase under 35 U.S.C. § 371 of International Patent Application No. PCT/KR2014/012491, filed on Dec. 17, 2014, which in turn claims the benefit of Korean Application No. 10-2013-0161895, filed on Dec. 23, 2013 and Korean Application No. 10-2014-0181751 filed on Dec. 16, 2014, the disclosures of which Applications are incorporated by reference herein.

TECHNICAL FIELD

A coating agent for an electrical steel sheet, a manufacturing method therefor, and an electrical steel sheet coating method using the same are disclosed.

BACKGROUND ART

A grain-oriented electrical steel sheet has a crystal texture that a bearing of crystal particles is oriented in (110)[001] direction and also has dramatically excellent magnetic characteristics in a pressing direction, so it has been used for an iron core material for a transformer, a motor, a generator, and other electronic devices.

In order to improve an insulation property and to enhance a close contacting property of coating layer, the grain-oriented electrical steel sheet is coated with an insulation coating layer, but recently, the grain-oriented electrical steel sheet is increasingly required to have a low iron loss, so the final insulation coating layer is seek to have a high tension. Actually, the insulation coating layer having a high tension significantly improves the magnetic characteristics of final product, so the various methods for controlling the process factors have been suggested to improve characteristics of the tension coating layer.

As the conventional method of applying a tensile stress to the grain-oriented electrical steel sheet, it is known to use the coefficient difference of thermal expansion between the insulation coating layer formed on the forsterite-based coating layer and the electrical steel sheet, and thereby, the tensile stress is applied to the steel sheet to provide the effects on reducing the iron loss.

The coated electrical steel coil is supplied in a hoop shape, and it is produced in a laminated core transformer and a wound core transformer according to the usage thereof. Particularly, in a case of the wound core for a pole mount transformer, sheet-shaped products are laminated and then cut and formed to be wound with copper and then performed with a stress relief heat treatment for removing stress generated by the process.

In this case, the iron loss may be even deteriorated after the stress annealing according to the heat treatment condition, causing the efficiency deterioration of transformer.

Particularly, in order to ensure the stress relieving effects within a short time, it is usually heat-treated at a high temperature of greater than or equal to 850° C., but, in this case, almost products occur iron loss deterioration, resulting that the efficiency of transformer is deteriorated.

Thus, grain-oriented electrical steel sheet product is required not to deteriorate iron loss even after the stress relief annealing at a temperature of greater than or equal to 850° C., and also to have excellent insulation.

DISCLOSURE

Technical Problem

A coating agent for an electrical steel sheet, a manufacturing method therefor, and an electrical steel sheet coating method using the same are provided.

Technical Solution

A coating agent for an electrical steel sheet according to an example embodiment of the present invention includes a metal phosphate derivative solution, colloid silica, chromium oxide, and solid silica.

The magnesium phosphate derivative may be represented by [Chemical Structural Formula 1], and the aluminum phosphate derivative may be represented by [Chemical Structural Formula 2].

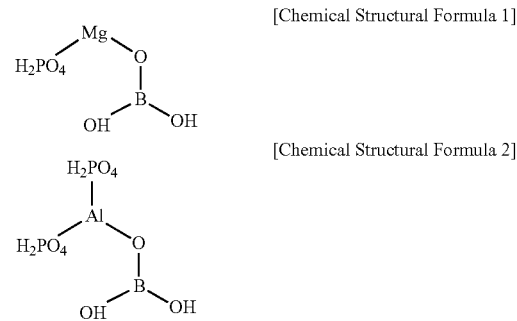

The silica may be included in an amount of 50 to 250 parts by weight and chromium oxide may be included in an amount of 5 to 15 parts by weight based on 100 parts by weight of the metal phosphate derivative solution.

The silica may be colloid silica, solid silica, or a mixture thereof.

In the case of a mixture of the colloid silica and the solid silica, the colloid silica may be included in an amount of 50 to 250 parts by weight and the solid silica may be included in an amount of 5 to 15 parts by weight based on 100 parts by weight of the metal phosphate derivative solution.

The coating agent for an electrical steel sheet may further include 1 to 5 parts by weight of porous silica based on 100 parts by weight of the metal phosphate derivative solution.

The porous silica, which is mesoporous, may have an average particle diameter of 50 to 100 nm and a pore size of less than or equal to 10 nm.

The coating agent for an electrical steel sheet may further include boron oxide.

The amount of boron oxide may be 1.5 to 20.7 parts by weight based on 100 parts by weight of the metal phosphate derivative solution.

The boron oxide may be $B_2O_3$.

The method of manufacturing a coating agent for an electrical steel sheet according to an embodiment of the present invention includes preparing a metal phosphate derivative; and adding silica and chromium oxide to a solution including the metal phosphate derivative. The metal phosphate derivative may be prepared by a condensation reaction of metal phosphate and boric acid ($H_3BO_3$).

The metal phosphate may be a first magnesium phosphate, a first aluminum phosphate, or a combination thereof.

The amount of metal phosphate derivative may be 58 wt % to 63 wt % based on the weight of metal phosphate derivative solution.

The method of manufacturing a coating agent for an electrical steel sheet may further includes adding porous silica in an amount of 1 to 5 parts by weight based on 100 parts by weight of the metal phosphate derivative solution.

The method of manufacturing a coating agent for an electrical steel sheet may further includes adding a boron oxide.

The boron oxide may be added in an amount of 1.5 to 20.7 parts by weight based on 100 parts by weight of the metal phosphate derivative solution.

In addition, the coating agent may further include a solvent, and the solvent may be included in an amount of 20 to 100 parts by weight based on based on 100 parts by weight of the metal phosphate derivative solution. The solvent may be pure water.

The method of coating an electrical steel sheet according to one embodiment of the present invention may include coating the coating agent on the grain-oriented electrical steel sheet that the finish annealing is completed; and heating the same at 550 to 900° C.

The coating amount may be 0.5 to 6.0 g/m$^2$, and the heating time may be 10 to 50 seconds.

In addition, the temperature of coating agent on the coating may be 15 to 25° C.

The electrical steel sheet according to one embodiment of the present invention includes a base steel sheet and a coating layer formed on the base steel sheet. The coating layer includes a metal phosphate derivative, silica, and chromium oxide, wherein the metal phosphate derivative is a single material of a magnesium phosphate derivative or a mixed material of an aluminum phosphate derivative and a magnesium phosphate derivative, and in the mixed material, an amount of aluminum phosphate derivative is 10 wt % or less (not including 0%).

The magnesium phosphate derivative may be represented by [Chemical Structural Formula 1], and the aluminum phosphate derivative may be represented by [Chemical Structural Formula 2].

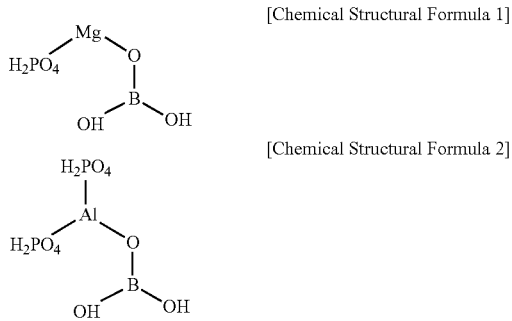

[Chemical Structural Formula 1]

[Chemical Structural Formula 2]

The coating layer may further include porous silica.

The porous silica, which is mesoporous, may have an average particle diameter of 50 to 100 nm and a pore size of less than or equal to 10 nm.

The coating layer may further include boron oxide.

The electrical steel sheet may have a minimum circular arc diameter, which does not cause the coating layer to be delaminated by the bending test, of less than or equal to 20 mmφ after a stress relief annealing at 845° C. to 875° C.

(the bending test is to obtain a minimum circular arc diameter not causing the coating layer to be delaminated when bending to contact with a circular arc of 10 to 100 mmφ, so as to evaluate a close contacting property).

The electrical steel sheet may have an insulation of less than or equal to 330 mA after the stress removal annealing at 845° C. to 875° C.

Advantageous Effect

A coating agent for an electrical steel sheet according to an example embodiment of the present invention has a good drying speed and excellent insulation even after the heat treatment at greater than or equal to 850° C.

In addition, a grain-oriented electrical steel sheet coated with the coating agent for an electrical steel sheet according to an example embodiment of the present invention does not cause the iron loss deterioration and the insulation decline even after the heat treatment at a high temperature of greater than or equal to 850° C.

MODE FOR INVENTION

Figure 1:
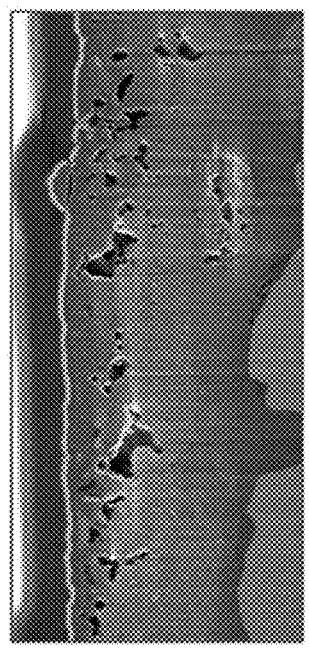
FIG. 1 is a photograph showing a coating layer of a grain-oriented electrical steel after planarization annealing and a coating layer after stress relief annealing.
Figure 1:
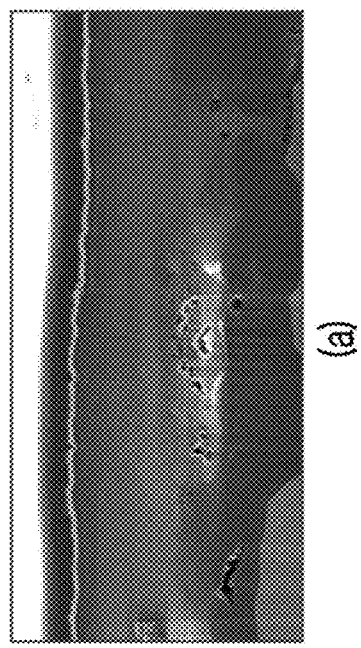

Merits and characteristics of the present invention, and methods for accomplishing them, will become more apparent from the following example embodiments taken in conjunction with the accompanying drawings. However, the present invention is not limited to the disclosed example embodiments, and may be implemented in various manners. The embodiments are provided to complete the disclosure of the present invention and to allow those having ordinary skill in the art to understand the scope of the present invention. The present invention is defined by the appended claims. Throughout the specification, the same constituent elements will be assigned the same reference numerals.

Therefore, in some embodiments, well-known process technologies are not explained in detail in order to avoid vague interpretation of the present invention. If not defined otherwise, all terms (including technical and scientific terms) in the specification may be defined as commonly understood by one skilled in the art. Throughout the specification, in addition, unless explicitly described to the contrary, the word "comprise" and variations such as "comprises" or "comprising", will be understood to imply the inclusion of stated elements but not the exclusion of any other elements. Further, the singular includes the plural unless mentioned otherwise.

One embodiment of the present invention provides a coating agent for preventing the iron loss deterioration even after the stress relief annealing (SRA) in the grain-oriented electrical steel sheet and also for preventing the rapidly insulation decline after the stress relief annealing (SRA).

The grain-oriented electrical steel sheet is performed with a secondary coating to provide a coating tension and an insulation and then formed as a coil shape. The obtained coil is reprocessed in a hoop shape having an appropriate size according to the usage and the size of transformer when making a final product. The case of wound core transformer used for a pole mount distribution transformer requires a forming process that a hoop-shaped cut core is processed by applying a little stress, and then it is performed with a heat treatment at a high temperature for relieving stress applied to the material after the forming process.

Accordingly, the goal of stress relief annealing may be understood to recover the iron loss which have damaged during the forming process. However, it is found that the iron loss is even increased after the stress relief annealing in the conventional product. When the transformer is produced with the product, the no-load iron loss of a transformer is increased to make unfavorable influences on the performance of transformer.

The reason why the iron loss is increased after stress relief annealing is caused by aluminum phosphate included as a component of the conventional tension coating agent. In the case of aluminum phosphate included in the conventional tension coating agent, the chemical and crystalline changes are occurred in drying an electrical steel sheet, as shown in the following Table 1.

TABLE 1

| Temperature | Chemical Reaction | Crystal Structure |
|---|---|---|
| Room temperature | $Al(H_2PO_4)_3 \cdot 3H_2O$ | Amorphous fraction > Crystalline fraction |
| about 100° C. | $Al(H_2PO_4)_3 \cdot 3H_2O \rightarrow Al(H_2PO_4)_3$ | |
| 250 to 300° C. | $2Al(H_2PO_4)_3 \rightarrow Al_2(H_2P_2O_7)_3 + 3H_2O$ | |
| 500 to 800° C. | $Al_2(H_2P_2O_7)_3 \rightarrow [Al(PO_3)_3]_{2n} + 3nH_2O$ | Meta phosphate |
| 800° C. or greater | $Al(PO_3)_3$ (b) $\rightarrow Al(PO_3)_3$ (a) | Amorphous fraction < Crystalline fraction |

As found in Table 1, aluminum phosphate in the coating agent generates water through the drying process, and simultaneously, it is changed from amorphous to crystalline, but the drying time is within 1 minute, so the chemical and crystalline changes are not completely performed as much as illustrated in Table 1. In other words, the hydroxyl (—OH) groups of aluminum phosphate are not participated in the reaction for 100% for the short drying time, and the considerable amount thereof is not reacted so remained on the surface of product.

Meanwhile, the grain-oriented electrical steel sheet generated through the coating process is performed with a stress relief annealing for greater than or equal to 2 hours during making the final product. In this case, the un-reacted hydroxyl groups present on the surface of product may be reacted with the atmosphere gas in the heating furnace as well as participated in the condensation reaction generated during the drying a coating, and also the crystalline fraction may be increased from amorphous according to a lapse of time of heat treatment. When the crystalline fraction is increased as above, it causes problems in that the electrical conductivity of coating surface is increased to reduce the insulation.

The other reason why the iron loss is increased after the stress relief annealing is caused by changing the colloid silica included as a component of the conventional tension coating agent.

As shown in FIG. 1(a), cracks of coating layer are rarely found in the case of grain-oriented electrical steel sheet after completing the planarization annealing. On the contrary, when performing the stress relief annealing at a high temperature, the coating is cracked as shown in FIG. 1 (b) to lose the coating tension, so as to lose the effects on reducing iron loss. This phenomenon is caused by the volumetric shrinkage accompanied with transforming silica of the coating layer from amorphous to crystalline during the stress relief annealing.

Figure 2:
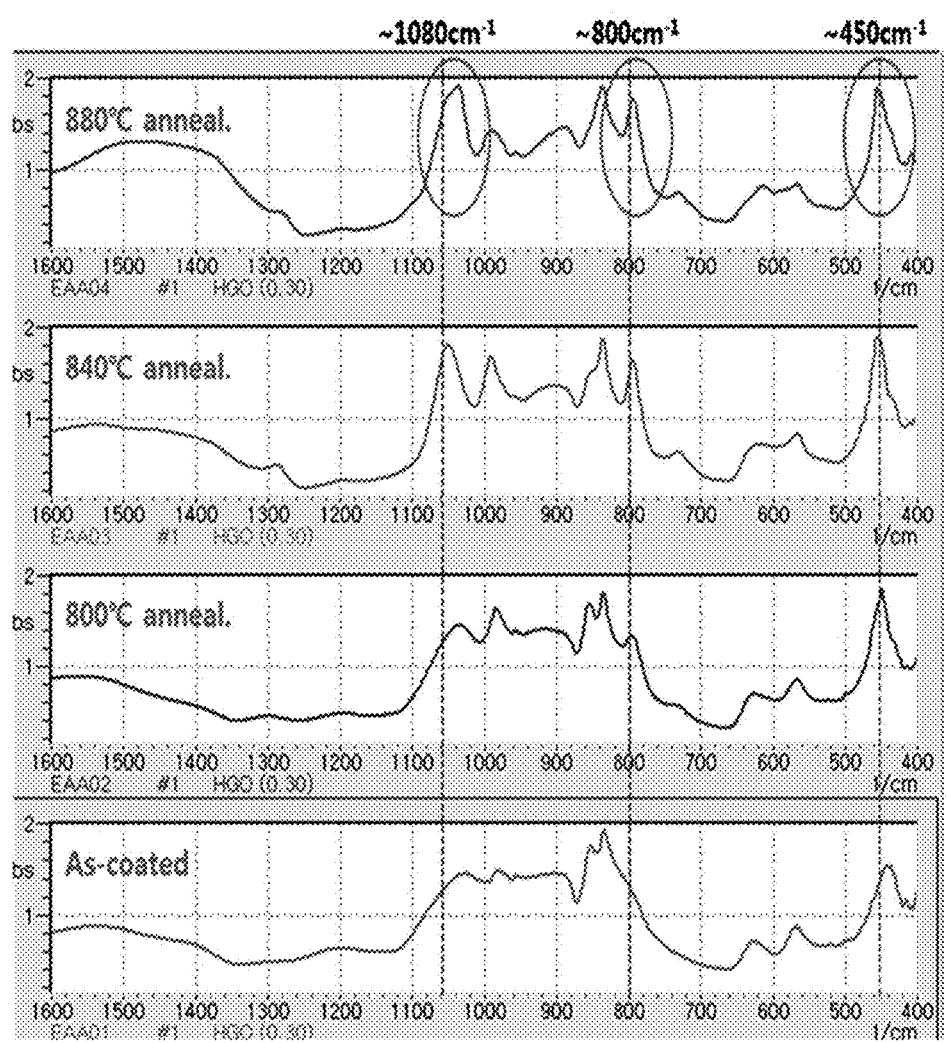
FIG. 2 shows FT-IR analyzing results of a grain-oriented electrical steel sheet after planarization annealing and an electrical steel sheet after stress relief annealing.

This is also found in the FT-IR results shown in FIG. 2. The IR peak in the product after completing the planarization annealing is observed at 800 $cm^{-1}$, which is caused by the bending vibration of Si—O molecule. On the other hand, when the temperature is increased for the stress relief annealing, the stretching vibration of Si-O molecule and 1080 $cm^{-1}$ are increased, and simultaneously, the peak around 800 $cm^{-1}$ is shifted. The shifting the bending vibration peak in a molecule and the developing the stretching peak mean the phase change in a molecule and are resulted from crystallizing $SiO_2$.

A coating agent for an electrical steel sheet according to an example embodiment of the present invention includes a metal phosphate derivative solution, silica, and chromium oxide.

The silica may be included in an amount of 50 to 250 parts by weight based on 100 parts by weight of the metal phosphate derivative solution. More specifically, it may be included in an amount of 90 to 130 parts by weight.

The silica may be colloid silica, solid silica, or a mixture thereof. By using a mixture of colloid silica and solid silica, the viscosity of coating agent may be adjusted.

When the silica is a mixture of colloid silica and solid silica, the colloid silica may be included in an amount of 50 to 150 parts by weight based on 100 parts by weight of the metal phosphate derivative solution. More specifically, it may be 90 to 110 parts by weight. In addition, the solid silica may be included in an amount of 5 to 15 parts by weight.

The chromium oxide may be included in an amount of 5 to 15 parts by weight based on 100 parts by weight of the metal phosphate derivative solution.

In addition, the coating agent for an electrical steel sheet may further include porous silica in 1 to 5 parts by weight based on 100 parts by weight of the metal phosphate derivative solution. When the porous silica is less than 1 part by weight, the effect of improving insulation is insufficient; when is greater than 5 parts by weight, the compatibility with other components in the coating agent may be deteriorated.

In addition, the coating agent may further include a solvent, and the solvent may be included in an amount of 20 to 100 parts by weight based on 100 parts by weight of the metal phosphate derivative solution. The solvent may be pure water.

The porous silica, which is mesoporous, may have an average particle diameter of 50 nm to 100 nm and a pore size of less than or equal to 10 nm.

In addition, the coating agent for an electrical steel sheet may further include boron oxide. The boron oxide may be included in an amount of 1.5 to 20.7 parts by weight based on 100 parts by weight of the metal phosphate derivative solution. When the weight parts of boron oxide is less than 1.5, the delay effects on crystallizing silica is not implemented; when is greater than or equal to 20.7, boron may be precipitated onto the coating agent.

The boron oxide may be $B_2O_3$.

According to an example embodiment of the present invention, the silica crystallization is delayed by adding boron oxide. Thus, the crystallization of coating layer is suppressed during the stress relief annealing to prevent the crack generation of coating layer.

The metal phosphate derivative may be a single material of a magnesium phosphate derivative or a mixed material of an aluminum phosphate derivative and a magnesium phosphate derivative.

In the mixed material, an amount of the aluminum phosphate derivative may be 10 wt % or less (not including 0%).

The magnesium phosphate derivative may be represented by [Chemical Structural Formula 1].

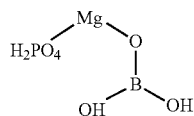

The aluminum phosphate derivative may be represented by [Chemical Structural Formula 2].

[Chemical Structural Formula 2]

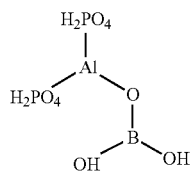

In an example embodiment of the present invention, a magnesium phosphate derivative represented by [Chemical Structural Formula 1] was used. Alternately, a mixed material of an aluminum phosphate derivative represented by [Chemical Structural Formula 2] and a magnesium phosphate derivative represented by [Chemical Structural Formula 1] may be used. In the mixture, an amount of the aluminum phosphate derivative may be 10 wt % or less relative to a weight of the mixture. When the amount of aluminum phosphate derivative is greater than 10 wt %, the iron loss and the insulation may be deteriorated after the stress relief annealing.

When using a single material of magnesium phosphate derivative or a mixed material of aluminum phosphate derivative and magnesium phosphate derivative as in above, the crystallization of silica for a coating layer is delayed. Thus the crystallization of coating layer is suppressed on the stress relief annealing to prevent the crack generation of coating layer. In addition, the material has more excellent insulation than the conventional aluminum phosphate.

The mentioned metal phosphate derivative is obtained by a condensation reaction of metal phosphate and boric acid ($H_3BO_3$) at a temperature of greater than or equal to 90° C. The metal phosphate may be a first magnesium phosphate or a first aluminum phosphate.

The magnesium phosphate derivative is prepared by the following reaction:

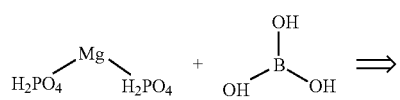

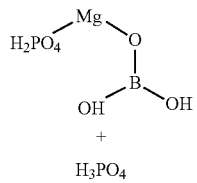

In addition, the aluminum phosphate derivative is prepared by the following reaction:

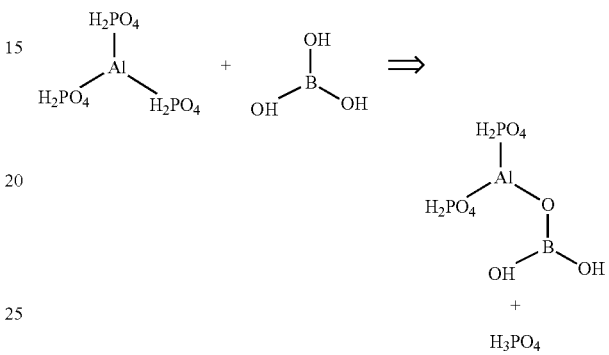

A method of preparing a coating agent for an electrical steel sheet according to an example embodiment of the present invention may include preparing the mentioned metal phosphate derivative and adding silica and chromium oxide into a solution including the metal phosphate derivative.

An amount of metal phosphate derivative may be 58 wt % to 63 wt % based on the weight of metal phosphate derivative solution.

An amount of silica may be 50 to 250 parts by weight based on based on 100 parts by weight of the metal phosphate derivative solution. More specifically, it may be 90 to 130 parts by weight.

The silica may be colloid silica, solid silica, or a mixture thereof. By using a mixture of colloid silica and solid silica, the viscosity of coating agent may be controlled.

When the silica is a mixture of the colloid silica and the solid silica, the colloid silica may be included in an amount of 50 to 250 parts by weight based on 100 parts by weight of the metal phosphate derivative solution silica. More specifically, it may be included in an amount of 90 to 110 parts by weight. In addition, the solid silica may be included in an amount of 5 to 15 parts by weight.

The chromium oxide may be included in an amount of 5 to 15 parts by weight based on 100 parts by weight of the metal phosphate derivative solution.

In addition, the coating agent may further include a solvent; and the solvent may be added in an amount of 20 to 100 parts by weight based on 100 parts by weight of the metal phosphate derivative solution. The solvent may be pure water.

In addition, porous silica may be further included in an amount of 1 to 5 parts by weight based on 100 parts by weight of the metal phosphate derivative solution.

The porous silica, which is mesoporous, may have an average particle diameter of 50 to 100 nm and a porous size of less than or equal to 10 nm.

In addition, boron oxide may be further included, the amount of boron oxide may be 1.5 to 20.7 parts by weight based on 100 parts by weight of the metal phosphate derivative solution.

The boron oxide may be $B_2O_3$.

The method of coating an electrical steel sheet according to an example embodiment of the present invention will be described.

The method of coating an electrical steel sheet according to an example embodiment of the present invention includes: coating the obtained coating agent on a grain-oriented electrical steel sheet having a primary coating layer that the finish annealing is completed; and heating the same at 550° C. to 900° C. The heating time may be 10 to 50 seconds.

The coating amount may be 0.5 to 6.0 g/m$^2$, more specifically 4.0 to 5.0 g/m$^2$. In addition, the temperature of coating agent may be 15 to 25° C. When the temperature of coating agent is less than or equal to 15° C., the viscosity is too increased to maintain a predetermined level of coating amount; when is greater than or equal to 25° C., the gelation of colloid silica, which is a main component of coating agent, is accelerated to deteriorate the surface quality.

The electrical steel sheet according to an example embodiment of the present invention includes a base steel sheet and a coating layer formed on the base steel sheet, wherein the coating layer include a metal phosphate derivative, silica, and chromium oxide. In addition, the metal phosphate derivative may be a single material of a magnesium phosphate derivative or a mixed material of an aluminum phosphate derivative and a magnesium phosphate derivative, and in the mixed material, and an amount of aluminum phosphate derivative is 10 wt % or less (not including 0%).

In addition, the magnesium phosphate derivative may be represented by [Chemical Structural Formula 1], and the aluminum phosphate derivative may be represented by [Chemical Structural Formula 2].

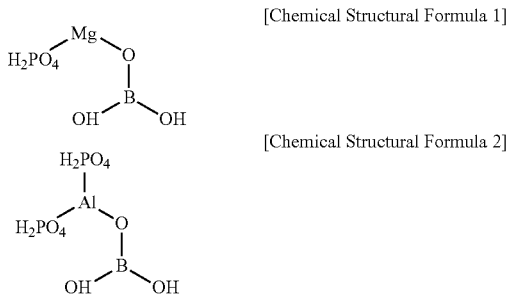

[Chemical Structural Formula 1]

[Chemical Structural Formula 2]

In addition, the coating layer may further include porous silica.

In addition, the porous silica, which is mesoporous, may have an average particle diameter of 50 to 100 nm and a pore size of less than or equal to 10 nm.

The coating layer may further include boron oxide.

The electrical steel sheet may have a minimum circular arc diameter of less than or equal to 20 mmφ, not causing the coating layer to be delaminated by a bending test, after the stress relief annealing at 845° C. to 875° C. The bending test is a test for obtaining a minimum circular arc diameter, not causing the coating layer to be delaminated by bending to contact the circular arc of 10 to 100 mmφ, so as to evaluate a close contacting property.

In addition, the electrical steel sheet may have an insulation of less than or equal to 330 mA after the stress relief annealing at 845° C. to 875° C. More specifically, it may be less than or equal to 312 mA.

The insulation is a storage current when flowing 0.5V, 1.0 A current under the pressure of 300 PSI.

Hereinafter, Examples are described in detail. However, the following examples show example embodiments of the present invention but do not limit it.

EXAMPLE 1

The experimental material is a grain-oriented electrical steel sheet (300 mm*60 mm) having a primary coating layer containing Si in a weight ratio of 3.1% and a sheet thickness of 0.23 mm and dried at 850° C. for 30 seconds to provide a specimen, and the obtained specimen is measured for the basic properties.

In Table 1, the coating agent is prepared with changing the composition ratio of metal phosphate, the iron loss and the insulation are expressed comparing before and after the stress relief annealing. In order to show the change after the stress relief annealing according to the composition ratio of metal phosphate, the composition ratio is varied as shown in Table 2; and boron oxide and porous silica are added to Compositions 8 to 14 to find whether the insulation is improved or not depending upon the presences of boron oxide and porous silica.

The evaluation is as follows:

The stress relief annealing is heat-treating at 845° C., 875° C., for greater than or equal to 2 hours under each $N_2$ (100%), $N_2$ (95%)+$H_2$ (5%) gas atmosphere; and the insulation refers to a storage current when flowing 0.5V, 1.0 A current under the 300 PSI pressure; the close contacting property is expressed by a minimum circular arc diameter, not causing the coating layer to be delaminated when bending a specimen to contact with the circular arc of 10, 20, 30 to 100 mmφ, before and after the stress relief annealing. The obtained coating agent is coated in 4 g/m$^2$, and the insulation and the coating tension are measured, and the results are shown in Table 3.

TABLE 2

| Specimen | Metal phosphate salt 100 g | | Colloid silica (g) | Boron oxide (g) | Solid silica (g) | Chromium oxide (g) | Porous silica (g) |
|---|---|---|---|---|---|---|---|
| | Mg phosphate salt derivative | Al phosphate salt derivative | | | | | |
| 1 | 0 | 100 | 100 | 0 | 10 | 10 | 0 |
| 2 | 10 | 90 | 100 | 0 | 10 | 10 | 0 |
| 3 | 25 | 75 | 100 | 0 | 10 | 10 | 0 |
| 4 | 50 | 50 | 100 | 0 | 10 | 10 | 0 |
| 5 | 75 | 25 | 100 | 0 | 10 | 10 | 0 |
| 6 | 90 | 10 | 100 | 0 | 10 | 10 | 0 |
| 7 | 100 | 0 | 100 | 0 | 10 | 10 | 0 |

TABLE 2-continued

| Specimen | Metal phosphate salt 100 g | | Colloid silica (g) | Boron oxide (g) | Solid silica (g) | Chromium oxide (g) | Porous silica (g) |
| --- | --- | --- | --- | --- | --- | --- | --- |
| | Mg phosphate salt derivative | Al phosphate salt derivative | | | | | |
| 8 | 0 | 100 | 100 | 5 | 10 | 10 | 2.5 |
| 9 | 10 | 90 | 100 | 5 | 10 | 10 | 2.5 |
| 10 | 25 | 75 | 100 | 5 | 10 | 10 | 2.5 |
| 11 | 50 | 50 | 100 | 5 | 10 | 10 | 2.5 |
| 12 | 75 | 25 | 100 | 5 | 10 | 10 | 2.5 |
| 13 | 90 | 10 | 100 | 5 | 10 | 10 | 2.5 |
| 14 | 100 | 0 | 100 | 5 | 10 | 10 | 2.5 |

In all compositions of Table 2, the solvent is water, and the adding amount thereof is 50 g.

TABLE 3

| Specimen | Before stress relief annealing | | | After stress relief annealing (845° C. * 2 hr* $N_2$ 100%) | | | After stress relief annealing (875° C. * 2 hr* $N_2$ 90% + $H_2$ 10%) | | |
| --- | --- | --- | --- | --- | --- | --- | --- | --- | --- |
| | Iron loss (W/Kg) | Insulation (mA) | Close contacting property (mmφ) | Iron loss (W/Kg) | Insulation (mA) | Close contacting property (mmφ) | Iron loss (W/Kg) | Insulation (mA) | Close contacting property (mmφ) |
| 1 | 0.82 | 158 | ≤20 | 0.85 | 650 | ≤30 | 0.87 | 822 | ≤30 |
| 2 | 0.82 | 122 | ≤20 | 0.85 | 621 | ≤30 | 0.87 | 711 | ≤30 |
| 3 | 0.82 | 136 | ≤20 | 0.84 | 632 | ≤30 | 0.87 | 688 | ≤30 |
| 4 | 0.82 | 149 | ≤20 | 0.84 | 603 | ≤30 | 0.86 | 667 | ≤30 |
| 5 | 0.82 | 165 | ≤20 | 0.82 | 540 | ≤20 | 0.84 | 612 | ≤20 |
| 6 | 0.82 | 157 | ≤20 | 0.82 | 312 | ≤20 | 0.82 | 488 | ≤20 |
| 7 | 0.82 | 125 | ≤20 | 0.82 | 250 | ≤20 | 0.81 | 302 | ≤20 |
| 8 | 0.82 | 57 | ≤20 | 0.85 | 542 | ≤30 | 0.87 | 838 | ≤30 |
| 9 | 0.82 | 43 | ≤20 | 0.85 | 512 | ≤30 | 0.87 | 769 | ≤30 |
| 10 | 0.82 | 39 | ≤20 | 0.85 | 488 | ≤30 | 0.86 | 607 | ≤30 |
| 11 | 0.82 | 55 | ≤20 | 0.85 | 322 | ≤30 | 0.86 | 488 | ≤30 |
| 12 | 0.82 | 47 | ≤20 | 0.83 | 267 | ≤30 | 0.83 | 357 | ≤30 |
| 13 | 0.82 | 64 | ≤20 | 0.81 | 279 | ≤20 | 0.81 | 305 | ≤20 |
| 14 | 0.82 | 31 | ≤20 | 0.79 | 211 | ≤20 | 0.80 | 255 | ≤20 |

As shown in Table 3, when the amounts of magnesium phosphate derivative and aluminum phosphate derivative are not in the range of the present invention, the iron loss is increased after the stress relief annealing, and the insulation is significantly deteriorated.

However, when the magnesium phosphate derivative is singularly used, or when using 90% or more of magnesium phosphate derivative and 10% or less of aluminum phosphate derivative, the iron loss and the insulation are improved.

In addition, in the case of a coating agent added with porous silica and boron oxide, the iron loss is improved from 0.82 to 0.80, 0.79, respectively, under the $N_2$ (100%) stress relief annealing conditions at 845° C. for 2 hours, and the insulation is also enhanced to 250, 302 mA until around 600 mA after the annealing. In addition, under the conditions of 875° C., 2 hr, $N_2$ (90%)+$H_2$ (10%), it is improved to 0.79, 0.80, and the insulation is also good enough in 302, 255 mA, respectively.

Figure 3:
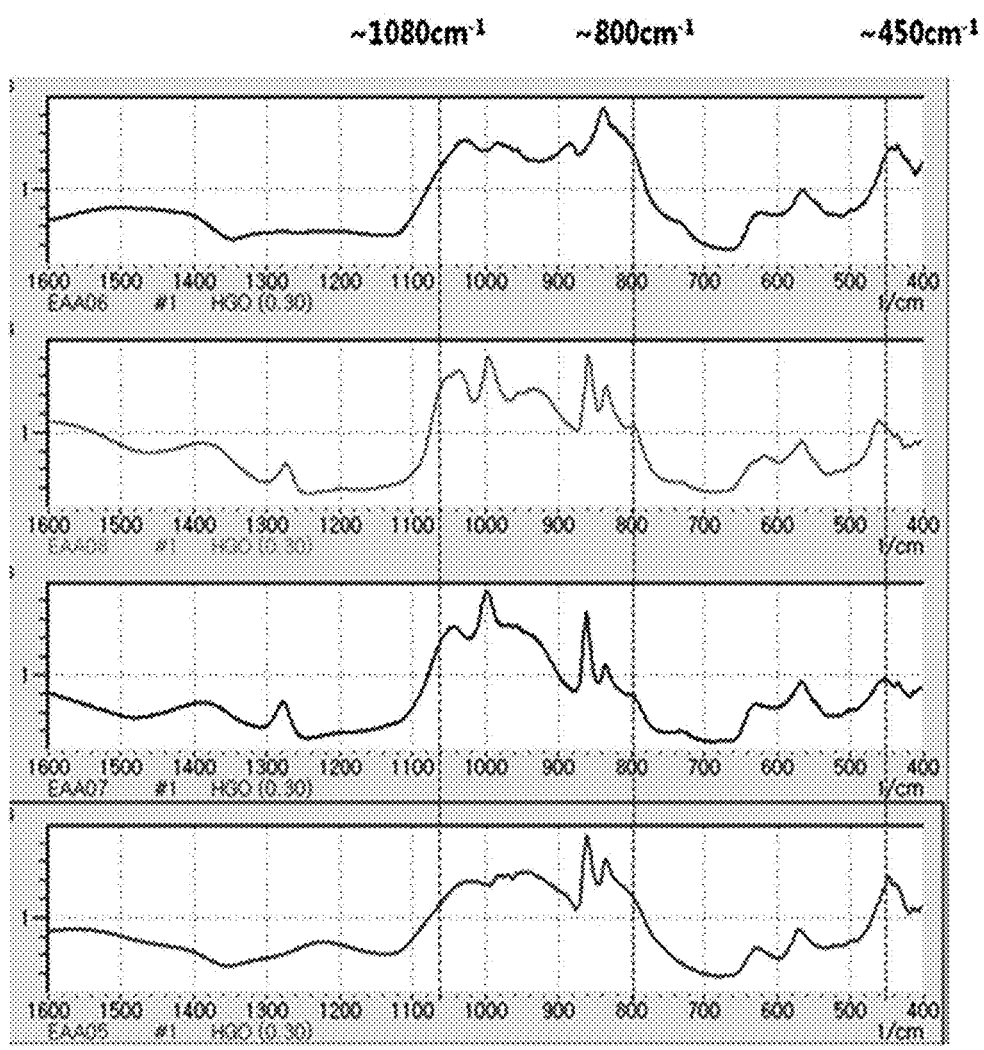
FIG. 3 shows FT-IR analyzing results of an electrical steel sheet coated with a coating agent according to an example embodiment of the present invention.

FIG. 3 shows FT-IR analyzing results of Specimen 14.

As shown in FIG. 3, it is understood that the crystalline fraction on the coating surface is significantly reduced after the stress relief annealing when is coated according to an embodiment of the present invention.

The example embodiments of the present invention have been described with reference to the accompanying drawings. However, it should be understood by those skilled in the art that the present invention can be implemented as other concrete embodiments without changing the technical spirit or essential features of the present invention.

Therefore, the aforementioned embodiments should be understood to be exemplary but not limiting the present invention in any way. The scope of the present invention is defined by the appended claims other than the detailed description, and all changes or modifications derived from the meaning and scope of the appended claims and their equivalents should be interpreted as falling within the scope of the present invention.

The invention claimed is:

1. A coating agent for an electrical steel sheet, comprising a metal phosphate derivative solution, silica, and chromium oxide, wherein in the metal phosphate derivative solution, the metal phosphate derivative is a single material of a magnesium phosphate derivative or a mixed material of an aluminum phosphate derivative and a magnesium phosphate derivative, in the mixed material of the aluminum phosphate derivative and magnesium phosphate derivative, an amount of the aluminum phosphate derivative is 10 wt % or less (not including 0%), wherein in the case that the silica is a mixture of colloid silica and solid silica, the colloid silica is added in an amount of 50 to 250 parts by weight based on 100 parts by weight of the metal phosphate derivative solution, and the solid silica is added in an amount of 5 to 15 parts by weight.

2. The coating agent for an electrical steel sheet of claim 1, wherein the magnesium phosphate derivative is represented by [Chemical Structural Formula 1], and the aluminum phosphate derivative is represented by [Chemical Structural Formula 2]:

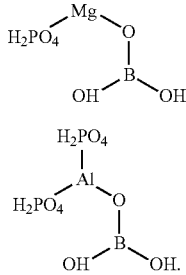

[Chemical Structural Formula 1]

[Chemical Structural Formula 2]

3. The coating agent for an electrical steel sheet of claim 2, wherein the silica is added in an amount of 50 to 250 parts by weight based on 100 parts by weight of the metal phosphate derivative solution, and chromium oxide is added in an amount of 5 to 15 parts by weight.

4. The coating agent for an electrical steel sheet of claim 1, wherein the coating agent for an electrical steel sheet further includes porous silica in an amount of 1 to 5 parts by weight of based on 100 parts by weight of the metal phosphate derivative solution.

5. The coating agent for an electrical steel sheet of claim 4, wherein the porous silica, which is mesoporous, has an average particle diameter of 50 to 100 nm and a pore size of less than or equal to 10 nm.

6. The coating agent for an electrical steel sheet of claim 1, the coating agent for an electrical steel sheet further includes boron oxide.

7. The coating agent for an electrical steel sheet of claim 6, wherein the boron oxide is added in an amount of 1.5 to 20.7 parts by weight based on 100 parts by weight of the metal phosphate derivative solution.

8. The coating agent for an electrical steel sheet of claim 7, wherein the boron oxide is $B_2O_3$.

9. The coating agent for an electrical steel sheet of claim 8, wherein the coating agent further includes a solvent, and the solvent is added in an amount of 20 to 100 parts by weight based on 100 parts by weight of the metal phosphate derivative solution.

* * * * *